United States Patent
Click et al.

(10) Patent No.: US 10,450,221 B2
(45) Date of Patent: Oct. 22, 2019

(54) HYBRID SOL-GEL COATED GLASS CONTAINERS

(75) Inventors: Carol A. Click, Perrysburg, OH (US); Pramod K. Sharma, Ann Arbor, MI (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 1297 days.

(21) Appl. No.: 13/034,407

(22) Filed: Feb. 24, 2011

(65) Prior Publication Data
US 2012/0217181 A1      Aug. 30, 2012

(51) Int. Cl.
  *C03C 17/00*   (2006.01)
  *C03C 1/00*    (2006.01)

(52) U.S. Cl.
  CPC ............ *C03C 17/005* (2013.01); *C03C 1/008* (2013.01); *C03C 17/009* (2013.01); *C03C 2218/113* (2013.01); *C03C 2218/114* (2013.01); *Y10T 428/1317* (2015.01)

(58) Field of Classification Search
  CPC .................................................. C03C 17/005
  USPC ..................................................... 427/376.2
  See application file for complete search history.

(56) References Cited

U.S. PATENT DOCUMENTS

| | | |
|---|---|---|
| 3,522,075 A | 7/1970 | Kiel |
| 3,582,395 A | 6/1971 | Adams et al. |
| 3,853,673 A | 12/1974 | Levene et al. |
| 3,912,100 A | 10/1975 | Graham et al. |
| 4,065,589 A | 12/1977 | Lenard et al. |
| 4,171,056 A | 10/1979 | Hannon et al. |
| 4,278,632 A | 7/1981 | Yoldas |
| 4,799,963 A | 1/1989 | Basil et al. |
| 4,814,017 A | 3/1989 | Yoldas et al. |
| 5,035,745 A | 7/1991 | Lin et al. |
| 5,051,298 A * | 9/1991 | Landry et al. ................ 428/220 |
| 5,316,854 A | 5/1994 | Lin et al. |
| 5,328,975 A | 7/1994 | Hanson et al. |
| 5,856,018 A | 1/1999 | Chen et al. |
| 6,264,859 B1 | 7/2001 | Basil et al. |
| 6,284,682 B1 * | 9/2001 | Troczynski ....... C04B 35/62222 501/111 |
| 6,355,189 B1 | 3/2002 | Basil et al. |
| 6,403,175 B1 | 6/2002 | Speier et al. |
| 6,921,578 B2 | 7/2005 | Tsujino et al. |
| 7,241,505 B2 | 7/2007 | Glaubitt et al. |

(Continued)

FOREIGN PATENT DOCUMENTS

| DE | 198 39 682 A1 | 3/2000 |
|---|---|---|
| EP | 0263428 B2 | 4/1988 |

(Continued)

OTHER PUBLICATIONS

Brinker, Hydrolysis and condensation of silicates: effects on structure, Journal of non-crystalline solids, 100, 1998, p. 31-50.*

(Continued)

*Primary Examiner* — Tabatha L Penny

(57) ABSTRACT

A glass container and related methods of manufacturing and coating glass containers. An exterior glass surface of a glass container is coated with a hybrid sol-gel and heated to cross-link the hybrid sol-gel. The resulting cross-linked hybrid sol-gel coating on the exterior glass surface of the glass container has greater than 90% silicate-based material by weight.

27 Claims, 3 Drawing Sheets

(56) References Cited

U.S. PATENT DOCUMENTS

| | | | |
|---|---|---|---|
| 7,393,469 B2 | 7/2008 | Benrashid et al. | |
| 7,572,512 B2 | 8/2009 | Brinley et al. | |
| 8,486,494 B2 | 7/2013 | Fukazawa et al. | |
| 2004/0057142 A1 | 3/2004 | Arfsten | |
| 2004/0248995 A1* | 12/2004 | Glaubitt et al. | 516/34 |
| 2006/0121190 A1 | 6/2006 | Tsujino et al. | |
| 2007/0065670 A1 | 3/2007 | Varaprasad | |
| 2009/0005513 A1 | 1/2009 | Liao et al. | |
| 2009/0176107 A1 | 7/2009 | Sharma | |

FOREIGN PATENT DOCUMENTS

| | | | |
|---|---|---|---|
| EP | 0 992 555 A1 | 4/2000 | |
| EP | 1 052 230 A1 | 11/2000 | |
| GB | 2 425 976 A | 11/2006 | |
| JP | 2001207115 A | 7/2001 | |
| JP | 2003285840 A | 10/2003 | |
| JP | 2008-273783 | * 11/2008 | C03C 17/30 |
| JP | 2008273783 A | 11/2008 | |
| WO | WO 01 32577 A1 | 5/2001 | |

OTHER PUBLICATIONS

Zaharescu, Sol-Gel SiO2-based Hybrid Coatings doped with Oxide Nanoparticles, National Seminar of Nanoscience and Nanotechnology, Mar. 20, 2008, p. 1-25.*

Synder, Cold-End Coatings in Glass Container Manufacture, 42nd Pacific Coast Regional Meeting/Ceramic Science and Technology Congress of the American Ceramic Society, Nov. 1, 1989, p. 1-4.*

Mennig, Wet Coating Technologies for Glass, The Sol-Gel Gateway, Mar. 8, 2001, p. 1-12.*

International Search Report and Written Opinion, Appln. No. PCT/US2012/026562, Filing Date: Feb. 24, 2012, dated Jul. 12, 2012, 10 pages.

Dr. Clement Sanchez, What are Hybrids?, The Sol-Gel Gateway, http://www.solgel.com/hybrids/hybrids.htm, retrieved Aug. 17, 2009, 5 pages.

First Office Action and Search Report, State Intellectual Property Office, People's Republic of China, Patent Appl. No. 201280010166.0, dated Jun. 3, 2015 (with translation).

* cited by examiner

HYBRID SOL-GEL COATED GLASS CONTAINERS

The present disclosure is directed to glass containers, and coating processes for glass containers including methods and materials for coating glass containers (e.g., glass bottles and jars).

BACKGROUND AND SUMMARY OF THE DISCLOSURE

Various processes have been developed to apply coatings to glass containers for different purposes, including glass strengthening for damage prevention and fragment retention. For example, U.S. Pat. No. 3,522,075 discloses a process for coating a glass container in which the glass container is formed, coated with a layer of metal oxide such as tin oxide, cooled through a lehr, and then coated with an organopolysiloxane resin-based material over the metal oxide layer. In another example, U.S. Pat. No. 3,853,673 discloses a method of strengthening a glass article by, for example, applying to a surface of the article a clear solution of a soluble, further hydrolyzable metallosiloxane, and maintaining the glass article at an elevated temperature sufficiently high to convert the metallosiloxane to a cross-linked polymetallosiloxane gel structure. In a further example, U.S. Pat. No. 3,912,100 discloses a method of making a glass container by heating the glass container and applying a polyurethane powder spray to the glass container.

A general object of the present disclosure, in accordance with one aspect of the disclosure, is to provide an improved method of increasing strength and/or fragment retention of a glass container.

The present disclosure embodies a number of aspects that can be implemented separately from or in combination with each other.

A method of coating an exterior surface of a glass container in accordance with one aspect of the disclosure includes the steps of (a) providing a heated hybrid sol-gel having a composition including at least one silane and at least one solvent, (b) coating the exterior glass surface of the glass container with the heated hybrid sol-gel, and (c) heating the coated exterior glass surface of the glass container to cross-link the hybrid sol-gel and result in a coating on the exterior glass surface of the glass container having greater than 90% silicate-based material by weight.

In accordance with a further aspect of the disclosure, there is provided a glass container that includes an axially closed base at an axial end of the glass container, a body extending axially from the base and being circumferentially closed, an axially open mouth at another end of the glass container opposite of the base, and an exterior glass surface. The glass container also includes a hybrid sol-gel cross-linked on at least a portion of the exterior glass surface.

In accordance with an additional aspect of the disclosure, there is provided a glass container that includes an axially closed base at an axial end of the glass container, a body extending axially from the base and being circumferentially closed, an axially open mouth at another end of the glass container opposite of the base, and an exterior glass surface. The glass container also includes a coating of hybrid sol-gel on at least a portion of the exterior glass surface, wherein the hybrid sol-gel includes at least one silane and at least one solvent.

In accordance with another aspect of the disclosure, there is provided a method of manufacturing a glass container including the steps of forming the glass container, applying a hot end coating to an exterior glass surface of the glass container, and annealing the glass container. The method also includes heating a hybrid sol-gel to a temperature of between 70 degrees Celsius and 130 degrees Celsius, wherein a composition of the hybrid sol-gel includes 50% to 60% by weight of at least one silane and 40% to 50% by weight of at least one solvent wherein the heated hybrid sol-gel has a viscosity of between 0.001 Pa-s and 100 Pa-s, coating the exterior glass surface of the glass container with the heated hybrid sol-gel, at a temperature between 80 degrees Celsius and 140 degrees Celsius, and heating the coated exterior glass surface of the glass container at a temperature between 140 degrees Celsius and 160 degrees Celsius for a time between ten minutes and ten hours to cross-link the hybrid sol-gel and result in a coating on the exterior glass surface of the glass container having greater than 90% silicate-based material by weight to increase at least one of strength or fragment retention of the glass container. The method further includes applying a cold end coating to the exterior glass surface of the glass container.

BRIEF DESCRIPTION OF THE DRAWINGS

The disclosure, together with additional objects, features, advantages and aspects thereof, will be best understood from the following description, the appended claims and the accompanying drawings, in which:

DETAILED DESCRIPTION OF PREFERRED EMBODIMENTS

Figure 1:
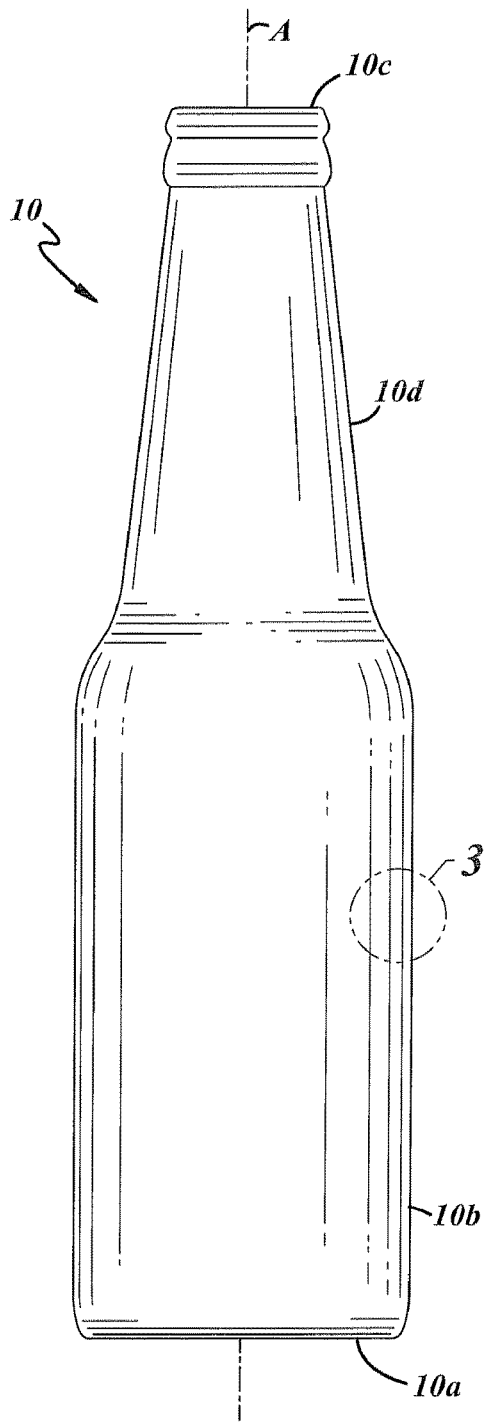
FIG. 1 is an elevational view of a glass container in accordance with an exemplary embodiment of the present disclosure.
Figure 2:
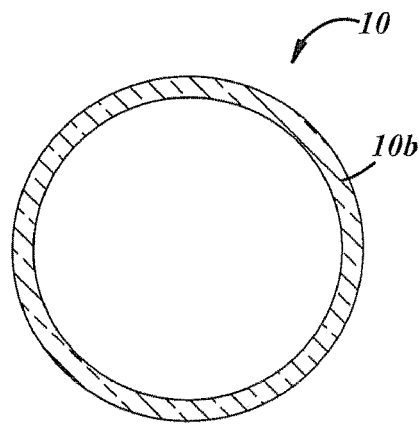
FIG. 2 is a cross-sectional view of the glass container body before coating.

FIG. 1 illustrates an exemplary embodiment of a glass container 10 that may be produced in accord with an exemplary embodiment of a manufacturing process presently disclosed hereinbelow. The glass container 10 includes a longitudinal axis A, a base 10a at one axial end of the container 10 that is closed in an axial direction, a body 10b extending in an axial direction from the axially closed base 10a, and a mouth 10c at another axial end of the container 10 opposite of the base 10a. Accordingly, the glass container 10 is hollow. In the illustrated embodiment, the container 10 also includes a neck 10d that may extend axially from the body 10b, may be generally conical in shape, and may terminate in the mouth 10c. However, the container 10 need not include the neck 10d and the mouth 10c may terminate the body 10b, such as in a glass jar embodiment or the like. The body 10b may be of any suitable shape in cross-section transverse to the axis A as long as the body 10b is circumferentially closed. For example, as shown in FIG. 2, the body 10b may be of cylindrical transverse cross-sectional shape that is circumferentially closed. In other embodiments, the body 10b may be generally oval, square, rectangular, or of any other suitable transverse cross-sectional shape. As used herein, the term "circumferentially" applies not only to circular or cylindrical transverse cross-sectional shapes but also applies to any transverse cross-sectional shape.

Figure 3:
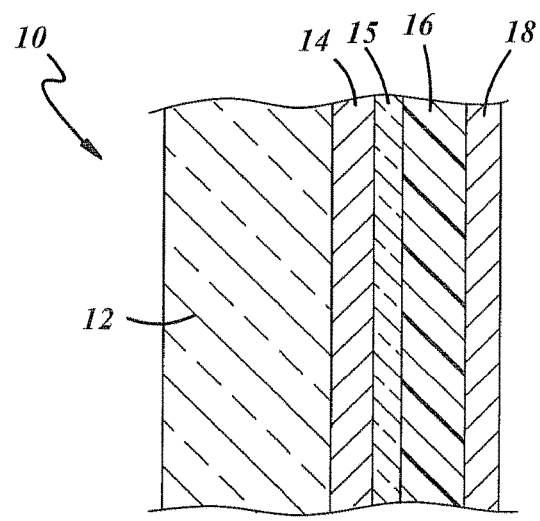
FIG. 3 is an enlarged sectional view of the glass container, taken from circle 3 of FIG. 1.

FIG. 3 illustrates that the container 10 includes a glass substrate 12, and may further include a hot end coating 14 applied to an exterior glass surface of the container 10 on the substrate 12. The container 10 also includes a cross-linked hybrid sol-gel coating 15 applied to the exterior glass surface of the container 10. The coating 15 may be applied over the hot end coating 14 or directly to the substrate 12. The container 10 further may include a cold end coating 16 applied to the exterior glass surface of container 10 over the cross-linked hybrid sol-gel coating 15, and an organic coating 18 applied to the exterior glass surface of the container 10 over the cold end coating 16. Although the various coatings 14-18 are shown as adjacent layers overlying one another sequentially, one or more of the coatings may penetrate into or even through one or more of the other coatings, and one or more of the coatings may be omitted. Accordingly, the various coatings 14-18 may be fairly described as being applied generally to the glass container 10, regardless of how or to what extent any given coating contacts any of the other coatings and/or the substrate 12. Similarly, when a material is described as being applied to an exterior glass surface of the glass container 10, the material may be applied over one or more of the coatings 14-18 and/or to the glass substrate 12 itself.

Figure 3A:
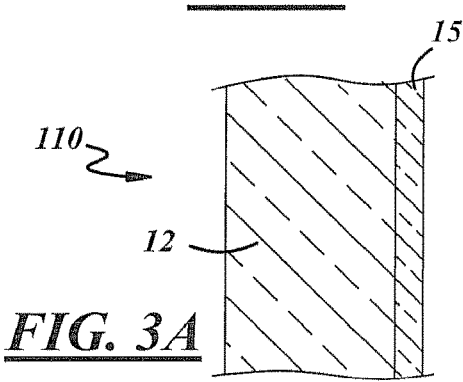
FIG. 3A is a sectional view of a glass container according to another embodiment.

In some embodiments, the cross-linked hybrid sol-gel coating 15 may replace one or more of the other coatings. For example, in one embodiment, the cross-linked hybrid sol-gel coating 15 may replace the hot end coating 14. In another embodiment, cross-linked hybrid sol-gel coating 15 may replace the cold end coating 16. Therefore, the container 10 may be free of conventional hot end and cold end coatings. In other words, the container 10 may be coated without conventional hot end and cold end coatings. One example of a container 110 of these embodiments is illustrated in FIG. 3A.

The coating 15 is produced by cross-linking a hybrid sol-gel that has the potential to increase the strength of glass containers by healing surface anomalies that may be present in the exterior surface of the container 10, and by preventing further creation of surface anomalies. For example, a heated hybrid sol-gel may flow into a crack in glass and be retained therein after cross-linking, thereby bridging and blunting a crack tip to increase a burst strength of the container 10. In another example, the heated hybrid sol-gel may uniformly cover an exterior surface of a glass container and, after cross-linking, may provide a uniform glass fragment retention layer for retention of glass fragments if the container breaks or becomes fractured.

For purposes of the present disclosure, a hybrid sol-gel is a sol-gel that is a hybrid of inorganic and organic components or precursors and is produced by a sol-gel process, but retains some of the organic nature of the organic precursor(s). The hybrid sol-gel is highly viscous at room temperature and has a relatively long "pot life" which lends itself to use in a glass container manufacturing environment. The viscosity of the hybrid sol-gel may be such that it barely flows under its own weight at room temperature. The hybrid nature of the hybrid sol-gel allows the precursor materials to flow and behave like an organic material when heated, until a cross-linking reaction occurs at a suitable cross-linking temperature to provide the coating 15. After cross-linking, the presently disclosed coating 15 is rigid, scratch resistant, and transparent. Therefore, unlike many conventional surface-sealing coatings, the coating 15 looks and feels like glass. Moreover, the applied coating 15 may be relatively temperature stable and may survive severe temperature extremes, for example, from −100 degrees Celsius to 450 degrees Celsius.

The glass container 10 can be produced in any suitable manner. This typically would involve a "hot end" including one or more melting furnaces, forming machines, and beginning portions of annealing lehrs, and a "cold end" that may include end portions of annealing lehrs and includes inspection equipment and packaging machines. Accordingly, a hot end coating is a coating applied at the hot end of the glass container manufacturing process, and a cold end coating is a coating applied at the cold end of the glass container manufacturing process.

After forming a plurality of the glass container 10 with forming machines, but prior to annealing, the glass containers may be hot-end coated in any suitable manner with any suitable hot-end coating materials to produce the hot-end coating 14.

The glass containers then may be annealed in any suitable manner, for example, in an annealing lehr. At an entry, hot end, or upstream portion of the annealing lehr, the temperature therein may be between 750 and 550 degrees Celsius. Through the lehr, the temperature may be brought down gradually to a downstream portion, cool end, or exit of the lehr, for example, to a temperature therein of between 130 degrees Celsius and 65 degrees Celsius.

In one embodiment, the hybrid sol-gel is applied to the containers at any temperature suitable for such application and, for example, in an intermediate portion of the annealing lehr that is upstream of the downstream portion of the lehr but downstream of the upstream portion of the lehr. In other words, the hybrid sol-gel may be applied to the containers after annealing begins but before annealing ends.

The temperature for applying the hybrid sol-gel cannot exceed its consolidation temperature, e.g. about 200 degrees Celsius, above which the sol-gel irreversibly hardens. Preferably, however, the hybrid sol-gel may be applied before the end of the annealing lehr where temperatures are insufficient for proper application of the hybrid sol-gel to the containers. Accordingly, in one embodiment, the hybrid sol-gel may be applied in the annealing lehr, upstream of a cold or downstream end thereof. In another embodiment, the glass containers may be directed off-line from the annealing lehr, coated with the hybrid sol-gel, and directed back on-line into the annealing lehr.

In a further embodiment, the hybrid sol-gel may be applied to the glass containers in a separate oven, lehr, or the like, downstream of the annealing lehr. In other embodiments, the hybrid sol-gel may be applied to the glass containers in any suitable location in a glass container manufacturing process.

A hybrid sol-gel is prepared for application to the containers to provide the coating 15. Specific examples of preparations are described herein below. In general, however, the hybrid sol-gel is composed of at least one silane and at least one solvent. Accordingly, in a preferred embodiment, the hybrid sol-gel is a liquid-silicate-based material have a very high solids content, for example, greater than 90% by volume.

The silane may be composed of one or more of the following silanes: methyltriethoxysilane, dimethyldiethoxysilane, phenyltriethoxysilane, diphenyldiethoxysilane, phenyltrimethoxysilane, or diphenyldimethoxysilane. The silanes maybe obtained from Gelest, Inc. of Morrisville, Pa., or any other suitable source(s). In other embodiments, the silane may include one more of the following silanes: 3-glycidoxypropyltrimethoxisilane, 3-glycidoxypropyldimethoxyethoxysilane, aminopropylmethyldimethosilane, aminopropyltrimethoxysilane, gamma mercaptopropyltrimethoxysilane, or vinyltrimethoxysilane. In one embodiment, the hybrid sol-gel includes a first silane and a multiple of the first silane. For example, the hybrid sol-gel may include methyltriethoxysilane and dimethyldiethoxysilane, or phenyltriethoxysilane and diphenyldiethoxysilane, or phenyldimethoxysilane and diphenyldimethoxysilane.

The solvent may be composed of one or more of the following solvents: denatured ethanol, anhydrous ethanol, or methanol. The solvents may be high purity solvents, and may be obtained from Fisher Scientific of Hampton, NH, or any other suitable source(s). In other embodiments, the solvent may include one or more of the following solvents: normal propanol, isopropanol, butanol, diethylene glycol, acetones, methylethylketones, tryethyleneglycols, vinylpyrrolidones, toluene, glycerine, phenol, benzyl alcohol, or dioxane.

In one embodiment, the silane may be 50% to 60% of the hybrid sol-gel by weight, and the solvent may be 40% to 50% of the hybrid sol-gel by weight. Accordingly, the weight ratio of silane to solvent may be between 1.5:1 and 1:1. In another embodiment, the silane may be between 52% and 58% of the hybrid sol-gel by weight, and the solvent may be between 42% and 46% of the hybrid sol-gel by weight. In a more particular embodiment, the silane may be about 56% of the hybrid sol-gel by weight, and the solvent may be about 44% of the hybrid sol-gel by weight. Accordingly, the weight ratio of silane to solvent may be about 1.3:1. As used herein, the term "about" means within two to three percent. In one embodiment, the hybrid sol-gel may consist essentially of the silane and solvent materials.

In another embodiment, the base composition of the hybrid sol-gel may be modified with other, additional materials. For example, the hybrid sol-gel may be doped with a dopant or doping material, for instance, an ultraviolet blocking material. Accordingly, materials for providing strengthening and ultraviolet blocking properties may be applied in only one step. Accordingly, an ultraviolet blocking material need not be applied in a coating step separate from the hybrid sol-gel coating step. As used herein, the phrase "ultraviolet blocking" includes reducing ultraviolet transparency and not necessarily resulting in 100% ultraviolet opacity. The ultraviolet blocking material may include one or more metal oxides, for example, at least one of cerium oxide, titanium oxide, zinc oxide, bismuth oxide, or barium titanate. In another embodiment, the ultraviolet blocking material may include one or more metal alkoxides, for example, at least one of cerium alkoxide or titanium dialkoxide. Accordingly, in this embodiment, the doped hybrid sol-gel may include, and preferably may consist essentially of, the silane, solvent, and one or more of the doping materials or dopants. In one embodiment, the ultraviolet blocking material may be 0% to 10% of the hybrid sol-gel by weight.

In any case, before the hybrid sol-gel is applied to the container, the hybrid sol-gel is heated to a temperature suitable to achieve a target viscosity of between 0.001 Pa-s and 100 Pa-s as the hybrid sol-gel is applied to the container. In a more particular embodiment, the target viscosity is between 0.025 Pa-s and 0.05 Pa-s. In a preferred embodiment, the target viscosity is about 0.0375 Pa-s. In one embodiment, the temperature of the hybrid sol-gel is between 70 degrees Celsius and 130 degrees Celsius. In a more particular embodiment, the temperature of the hybrid sol-gel is between 90 degrees Celsius and 110 degrees Celsius. In a preferred embodiment, the temperature of the hybrid sol-gel is about 100 degrees Celsius.

The exterior glass surface of the container is coated with the heated hybrid sol-gel in any suitable manner. For example, the heated hybrid-sol gel may be sprayed onto the exterior glass surface in any suitable manner, the container may be dipped in the heated hybrid sol-gel in any suitable manner, or the like. The hybrid sol-gel is coated to the container at a temperature in the oven or lehr of between 80 degrees Celsius and 140 degrees Celsius. In a more particular embodiment, the temperature is between 95 degrees Celsius and 125 degrees Celsius. In a preferred embodiment, the temperature is about 110 degrees Celsius. Preferably, the temperature is higher than the temperature of the heated hybrid sol-gel. For example, the temperature differential is preferably between 5 degrees Celsius and 15 degrees Celsius and, more preferably, about 10 degrees Celsius.

The coated exterior glass surface of the container is heated for a time and at a temperature suitable to cross-link the hybrid sol-gel to result in the coating 15 having greater than 90% silicate-based material by weight to increase strength of the container. For example, the coating 15 may have greater than 90% silica-based material. The silicate-based material may bond to the glass container 10 in any suitable manner. In one embodiment, the temperature in the oven or lehr is between 130 degrees Celsius and 170 degrees Celsius for a time of between ten minutes and ten hours. In a more particular embodiment, the temperature is between 140 degrees Celsius and 160 degrees Celsius. In a preferred embodiment, the temperature is about 150 degrees Celsius. The precursors are hydrolysed in the reaction, which is followed by a condensation reaction, but no cross-linker materials need be used. Accordingly, the cross-linking reaction may be free of cross-linkers.

In one embodiment, where the coated containers pass continuously through the annealing lehr, the lehr may be constructed and operated to decrease the temperature of the glass containers to a level suitable for applying the hybrid sol-gel, then increase the temperature of the glass containers to a level suitable for cross-linking the hybrid sol-gel, and then decrease the temperature of the glass containers to the downstream end temperature of the lehr. In other embodiments, the cross-linking may be conducted in an off-line loop parallel with the annealing lehr before the containers are brought back into the lehr, may be conducted downstream of the lehr, or the like.

At the end, or downstream of, the annealing lehr, the glass containers maybe cold-end coated in any suitable manner. For example, the glass containers may be coated with the cold end coating 16, which may be a protective organic coating applied downstream or at an end of the annealing lehr. The cold end coating 16 may include a polyethylene material, like a polyethylene wax or the like, or may include any other suitable cold end coating material.

After the cold end coating is applied, the glass containers may be inspected for any suitable characteristics and in any suitable manner. For example, the glass containers may be manually or automatically inspected for cracks, inclusions, surface irregularities, hot end and/or cold end coating properties, and/or the like.

The organic coating 18 may be applied to the glass containers in any suitable manner by any suitable equipment. For example, the organic coating 18 may be electrostatically applied to exterior glass surfaces of the glass containers, for example, after inspection.

After applying the organic coating, the glass containers may be cured in any suitable manner. For example, the curable organic coating may be a radiation-curable organic coating cured by any suitable type of radiation like, for instance, ultraviolet or electron beam radiation.

After curing, the glass containers may be packaged in any suitable manner.

The manufacturing process may or may not include all of the disclosed steps or be sequentially processed or processed in the particular sequence discussed, and the presently disclosed manufacturing process and coating methods encompass any sequencing, overlap, or parallel processing of such steps.

The present disclosure provides advancements in the art. For example, the cross-linked hybrid sol-gel coating can increase glass container strength by better healing of glass surface anomalies. In another example, the cross-linked hybrid sol-gel coating can increase glass container strength by retaining glass fragments, without using polyurethane or conventional additives. As used herein, the terminology fragment-retention is a characteristic well known to those of ordinary skill in the art of glass container manufacturing that relates to holding of glass fragments in the event that a glass container fractures or breaks, for example, from being dropped on hard ground.

Conventionally, it has been understood that sol-gels can be uniformly applied to flat glass to achieve a thin and somewhat brittle coating to increase glass strength. But it was also understood that it was not cost-effective or was impossible to uniformly apply the same sol-gels in solid and continuous films over exterior surfaces of glass containers to achieve reliable glass strengthening results. Contrary to conventional wisdom, it is now possible and cost-effective to produce glass containers with a cross-linked hybrid sol-gel coating applied with relatively uniform coverage to achieve a relatively thicker and stronger coating.

It has also been conventionally understood that fragment retention coatings for glass containers are composed of a polyurethane base formed from an isocyanate monomer or prepolymers of isocyanates, and additives like bisphenol A, melamine, benzoguanamine, and the like to enable room temperature curing. But isocyanates and such additives tend to be cost-prohibitive and undesirable. Contrary to conventional wisdom, it is now possible to produce glass containers with an isocyanate-free and amine-group-free fragment retention coating that is cost-effective and desirable.

Therefore, the presently disclosed method provides simple but elegant solutions to problems in the art of glass container manufacturing that have long been experienced but apparently unappreciated.

EXAMPLES

Below, with reference to Table 1, several examples of hybrid sol-gels and their preparation are provided and explained, as well as a coating technique and performance results.

TABLE 1

| Examples | Silane #1 | Silane #2 | Solvent | Coating | Healing |
| --- | --- | --- | --- | --- | --- |
| Examples #1 | MethyltriethoxySilane | DimethyldiethoxySilane | Denatured Ethanol | Haze | Yes |
| Examples #2 | MethyltriethoxySilane | DimethyldiethoxySilane | Anhydrous Ethanol | Transparent | Yes |
| Examples #3 | PhenyltriethoxySilane | DiphenyldiethoxySilane | Anhydrous Ethanol | Transparent | Yes |
| Examples #4 | PhenyltrimethoxySilane | DiphenyldimethoxySilane | Methanol | Transparent | Yes |

Example #1

Solution Preparation

A solution A was prepared using 8.1 ml of $H_2O$, 0.15 gm of HCl (37.1%) and 13.84 gm of denatured ethanol. Solution A was then stirred for 15 minutes.

A solution B was prepared using 27.04 gm of methyltriethoxysilane (Silane #1) and 13.79 gm of methanol. Solution B was then stirred for 15 minutes.

Then, solution B was added to solution A very slowly under continuous magnetic stirring. A beaker containing the combined solution A+B was covered with a PARAFILM brand foil. The stirring was kept constant for 3 hours.

A solution C was prepared using 7.64 gm of dimethyldiethoxysilane (Silane #2) and 9.21 gm of denatured ethanol, at about 2 hours and 45 minutes after beginning stirring of the combined solution A+B. Solution C was stirred for 15 minutes.

Then, solution C was added drop wise to the combined solution A+B and stirred for 3 more hours. The stirring of the combined solution A+B+C was continued in a closed system for another 2 hours.

2.78 micro liters of ammonium hydroxide 30% were added after the aforementioned 2 hours of stirring the combined solution A+B+C. The stirring of the combined solution A+B+C+ammonium hydroxide was continued in a closed system for another one hour.

Then, the PARAFILM brand foil was removed and continuous mixing was conducted for 48 hours. A very viscous gel was obtained.

This gel was dried overnight at 70 degrees Celsius to remove the rest of the alcohol.

To the so prepared gel, 10 ml of pure acetone were added and stirred for 2 hours.

Thereafter, the solution was filtrated using a Buchner funnel to remove the byproducts. The solution obtained after filtration was continuously stirred for 5-7 hours until all acetone was evaporated. A hazy clear gel was obtained.

Then, the gel was thermally treated for 24 hours at 70 degrees Celsius to remove any trace of acetone and alcohol. Another thermal treatment was performed at 110 degrees Celsius for 24 hours to remove water traces and obtain the hybrid sol-gel.

Coating Formation

Glass substrates of 2" by 2" size were cleaned by soap and water. The glass substrates were then wiped by isopropanol and dried well.

On a first sample of the glass substrates, a crack was formed on the glass substrate using a Vickers hardness instrument at 25 gf for 30 sec. The glass substrate was coated with the hybrid sol-gel using a drawdown bar (#8). The coating was then cured at 150 degrees Celsius for 6 hours to cross link the hybrid sol-gel.

Performance After Curing

Figure 4A:
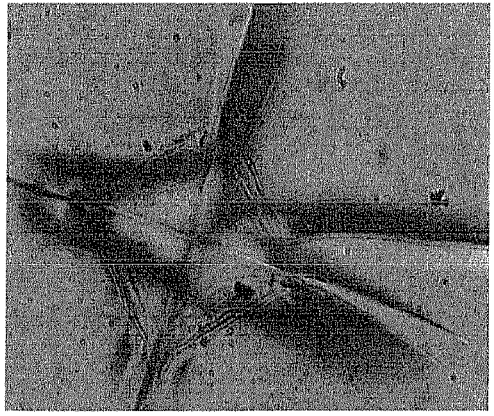
FIG. 4A is micrograph taken of portion of a glass container before a hybrid sol-gel coating is applied and cross-linked in accordance with Example #1 described herein below.
Figure 4B:
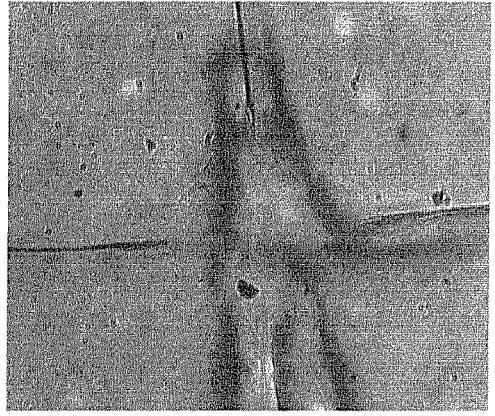
FIG. 4B is micrograph taken of portion of a glass container including the cross-linked hybrid sol-gel coating in accordance with Example #1 described herein below.

On the first sample, the coating was analyzed by optical microscopy to analyze the healing effect on the crack. Micrographs of the crack were taken before and after the coatings as illustrated in FIGS. 4A and 4B, respectively, and indicated that the crack was filled by the coating.

On an opposite, uncoated, side of the second sample, a line was scribed along the glass substrate by a diamond cutter. The second sample was flipped over, held along one edge, and struck with a rounded side of the diamond cutter to create a fragment fractured along the scribed line. The fragment was held to the rest of the second sample by the cross-linked hybrid sol-gel coating.

Example #2

Example #2 was similar to example #1 in solution preparation and coating formation. The silane #1 and silane #2 used in example #2 are methyltriethoxysilane and dimethyldiethoxysilane respectively. The solvent used in this example was anhydrous ethanol instead of denatured ethanol.

Figure 5A:
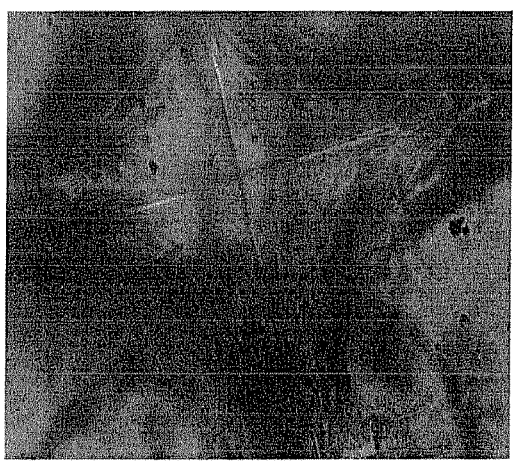
FIG. 5A is micrograph taken of portion of a glass container before a hybrid sol-gel coating is applied and cross-linked in accordance with Example #2 described herein below.
Figure 5B:
FIG. 5B is micrograph taken of portion of a glass container including the cross-linked hybrid sol-gel coating in accordance with Example #2 described herein below.

On a first sample, micrographs of the crack were taken before and after the coatings as illustrated in FIGS. 5A and 5B, respectively, and indicated that the crack was filled by the coating.

After scribing and striking a second sample, the fragment was held to the rest of the second sample by the cross-linked hybrid sol-gel coating.

Example #3

Figure 6A:
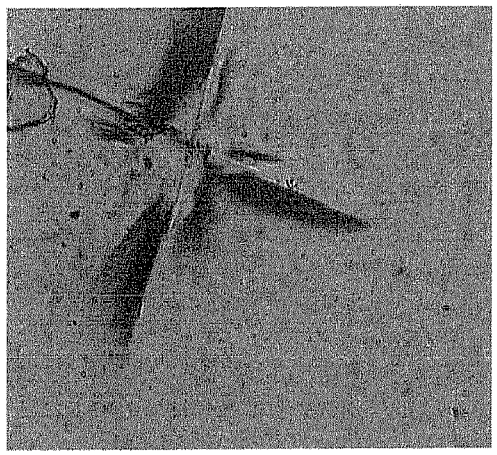
FIG. 6A is micrograph taken of portion of a glass container before a hybrid sol-gel coating is applied and cross-linked in accordance with Example #3 described herein below.
Figure 6B:
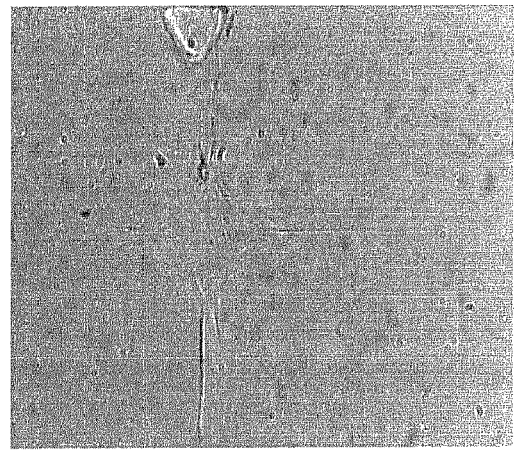
FIG. 6B is micrograph taken of portion of a glass container including the cross-linked hybrid sol-gel coating in accordance with Example #3 described herein below.

Example #3 was similar to example #1 in solution preparation and coating formation. The silane #1 and silane #2 used in example #3 are phenyltriethoxysilane and diphenyldiethoxysilane respectively. The solvent used in this example was anhydrous ethanol instead of denatured ethanol On a first sample, micrographs of the crack were taken before and after the coatings, as illustrated in FIGS. 6A and 6B, respectively, and indicated that the crack was filled by the coating.

After scribing and striking a second sample, the fragment was held to the rest of the second sample by the cross-linked hybrid sol-gel coating.

Example #4

Example #4 was similar to example #1 in solution preparation and coating formation. The silane #1 and silane #2 used in example #4 are phenyltriethoxysilane and diphenyldiethoxysilane respectively. The solvent used in this example was methanol instead of denatured ethanol.

Figure 7A:
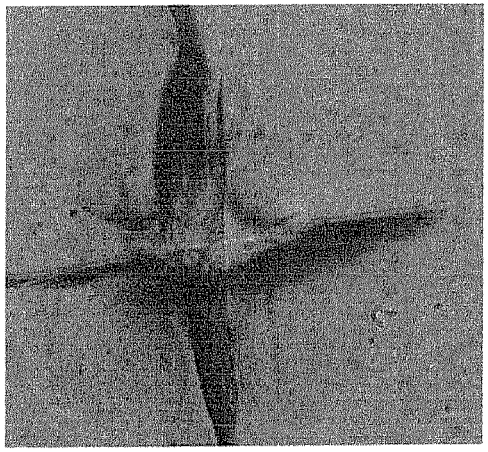
FIG. 7A is micrograph taken of portion of a glass container before a hybrid sol-gel coating is applied and cross-linked in accordance with Example #4 described herein below.
Figure 7B:
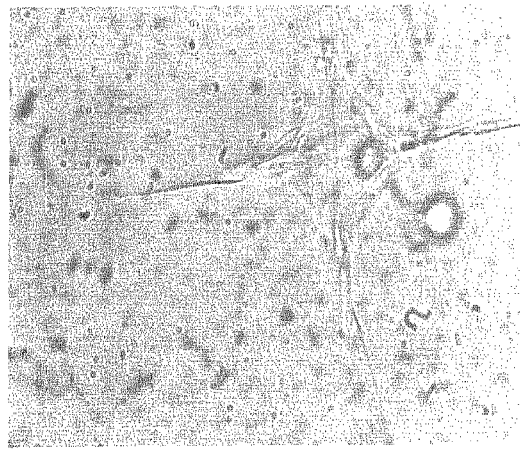
FIG. 7B is micrograph taken of portion of a glass container including the cross-linked hybrid sol-gel coating in accordance with Example #4 described herein below.

On a first sample, micrographs of the crack were taken before and after the coatings, as illustrated in FIGS. 7A and 7B, respectively, and indicated that the crack was filled by the coating.

After scribing and striking a second sample, the fragment was held to the rest of the second sample by the cross-linked hybrid sol-gel coating.

There thus has been disclosed methods of coating glass containers and methods of manufacturing glass containers that at least partially satisfy one or more of the objects and aims previously set forth. The disclosure has been presented in conjunction with several exemplary embodiments, and additional modifications and variations have been discussed. Other modifications and variations readily will suggest themselves to persons of ordinary skill in the art in view of the foregoing discussion. The disclosure is intended to embrace all such modifications and variations as fall within the spirit and broad scope of the appended claims.

The invention claimed is:

1. A method of coating an exterior surface of a glass container that includes the steps of:
   (a) providing a hybrid sol-gel having a solids content of greater than 90% by volume and being formed from a composition including at least one silane and at least one solvent;
   (b) heating said hybrid sol-gel to produce a heated hybrid sol-gel having a target viscosity of between 0.025 Pa·s and 0.05 Pa·s;
   (c) coating the exterior glass surface of the glass container with said heated hybrid sol-gel; and
   (d) heating said coated exterior glass surface of the glass container to cross-link said hybrid sol-gel and result in a transparent coating on said exterior glass surface of the glass container having greater than 90% silicate-based material by weight.

2. The method set forth in claim 1 wherein said composition in step (a) includes between 50% and 60% by weight of at least one silane and between 40% and 50% by weight of at least one solvent.

3. The method set forth in claim 1 wherein said composition in step (a) includes between 52% and 58% by weight of at least one silane and between 42% and 46% by weight of at least one solvent, said temperature in step (b) is between 90 degrees Celsius and 110 degrees Celsius, said temperature in step (c) is between 95 degrees Celsius and 125 degrees Celsius, and said heating step (d) is carried out at a temperature of between 140 degrees Celsius and 160 degrees Celsius.

4. The method set forth in claim 1 wherein said composition in step (a) includes about 56% by weight of at least one silane and about 44% by weight of at least one solvent, said temperature in step (b) is about 100 degrees Celsius, said temperature in step (c) is about 110 degrees Celsius, and said heating step (d) is carried out at a temperature of about 150 degrees Celsius.

5. The method set forth in claim 1 wherein said at least one silane in step (a) includes at least one of methyltriethoxysilane, dimethyldiethoxysilane, phenyltriethoxysilane, diphenyldiethoxysilane, phenyltrimethoxysilane, diphenyldimethoxysilane, 3 glycidoxypropyltrimethoxisilane, 3 glycidoxypropyldimethoxyethoxysilane, aminopropylmethyldimethosilane, aminopropyltrimethoxysilane, gamma mercaptopropyltrimethoxysilane, or vinyltrimethoxysilane, and wherein said at least one solvent in step (a) includes at least one of anhydrous ethanol, methanol, normal propanol, isopropanol, butanol, diethylene glycol, acetones, methylethylketones, tryethyleneglycols, vinylpyrrolidones, toluene, glycerine, phenol, benzyl alcohol, or dioxane.

6. The method set forth in claim 1 wherein said at least one silane in step (a) includes methyltriethoxysilane and dimethyldiethoxysilane, and wherein said at least one solvent includes at least one of methanol or anhydrous ethanol.

7. The method set forth in claim 1 wherein said at least one silane in step (a) includes phenyltriethoxysilane and diphenyldiethoxysilane, and wherein said at least one solvent includes anhydrous ethanol.

8. The method set forth in claim 1 wherein said at least one silane in step (a) includes phenyltrimethoxysilane and diphenyldimethoxysilane, and wherein said at least one solvent includes methanol.

9. The method set forth in claim 1 wherein said composition in step (a) includes a silane to solvent weight ratio of between 1.5:1 and 1:1.

10. The method set forth in claim 1 wherein said composition in step (a) includes a silane to solvent weight ratio of about 1.3:1.

11. The method set forth in claim 1 wherein said hybrid sol-gel is doped with an ultraviolet blocking material, wherein ultraviolet blocking material is not applied in a separate step.

12. The method set forth in claim 11 wherein said ultraviolet blocking material is at least one of cerium oxide, titanium oxide, zinc oxide, bismuth oxide, or barium titanate.

13. The method set forth in claim 1 wherein said hybrid sol-gel is doped with at least one metal alkoxide that is not applied in a separate step.

14. The method set forth in claim 13 wherein said at least one metal alkoxide is at least one of cerium alkoxide or titanium dialkoxide.

15. The method set forth in claim 1 wherein said at least one silane includes at least one of methyltriethoxysilane, dimethyldiethoxysilane, phenyltriethoxysilane, diphenyldiethoxysilane, phenyltrimethoxysilane, diphenyldimethoxysilane, 3 glycidoxypropyltrimethoxi silane, 3 glycidoxypropyldimethoxyethoxysilane, aminopropylmethyldimethosilane, aminopropyltrimethoxysilane, gamma mercaptopropyltrimethoxysilane, or vinyltrimethoxysilane.

16. The method set forth in claim 1 wherein said at least one solvent includes at least one of anhydrous ethanol, methanol, normal propanol, isopropanol, butanol, diethylene glycol, acetones, methylethylketones, tryethyleneglycols, vinylpyrrolidones, toluene, glycerine, phenol, benzyl alcohol, or dioxane.

17. The method set forth in claim 1 wherein said step (c) is performed at a temperature between 5 degrees Celsius and 15 degrees Celsius higher than the temperature at which the hybrid sol-gel is heated in said step (b).

18. The method set forth in claim 1 wherein step (b) includes heating the hybrid sol-gel to a temperature between 70 degrees Celsius and 130 degrees Celsius to obtain the target viscosity.

19. The method set forth in claim 18 wherein step (d) is carried out at a temperature between 130 degrees Celsius and 170 degrees Celsius.

20. The method set forth in claim 1 wherein step (c) is carried out at a temperature between 90 degrees Celsius and 130 degrees Celsius.

21. The method set forth in claim 1 that includes, after step (d), applying an organic cold end coating to the exterior glass surface of the glass container over the transparent coating.

22. The method set forth in claim 1 wherein said heated hybrid sol-gel is coated onto the exterior glass surface of the glass container by being sprayed onto the exterior glass surface of the glass container.

23. A method of coating an exterior surface of a glass container that includes:
coating an exterior glass surface of a glass container with a hybrid sol-gel having a temperature between 70 degrees Celsius and 130 degrees Celsius, a solids content of greater than 90% by volume, and a target viscosity of between 0.025 Pa·s and 0.05 Pa·s; and
heating the exterior glass surface of the glass container to cross-link said hybrid sol-gel and result in a uniform coating on the exterior glass surface of the glass container.

24. The method set forth in claim 23 wherein said hybrid sol-gel is formed from a method that includes:
(i) providing a solution including a silane and a solvent;
(ii) allowing the silane and the solvent to interact with one another for a sufficient amount of time to obtain a gel; and then
(iii) heating the gel at a sufficient temperature and for a sufficient amount of time to remove the solvent and water therefrom.

25. The method set forth in claim 23 wherein the hybrid sol-gel is formed from a composition that includes between 50% and 60% by weight of at least one silane and between 40% and 50% by weight of at least one solvent.

26. The method set forth in claim 23 wherein the exterior glass surface of the glass container is heated at a temperature of between 130 degrees Celsius and 170 degrees Celsius to cross-link the hybrid sol-gel.

27. The method set forth in claim 23 wherein said hybrid sol-gel is coated onto the exterior glass surface of the glass container by being sprayed onto the exterior glass surface of the glass container.

\* \* \* \* \*